United States Patent
Fang et al.

[11] Patent Number: 5,795,554
[45] Date of Patent: Aug. 18, 1998

[54] METHOD FOR PREPARING THE OXYSULFIDES OF RARE EARTH ELEMENTS

[75] Inventors: Ming Fang; Jian Xin Ma, both of Clearwater Bay; Ngai Ting Lau, Tai Po, all of Hong Kong

[73] Assignee: The Hong Kong University of Science & Technology, Hong Kong

[21] Appl. No.: 790,600

[22] Filed: Jan. 29, 1997

Related U.S. Application Data

[60] Division of Ser. No. 674,715, Jul. 2, 1996, which is a continuation-in-part of Ser. No. 357,028, Dec. 16, 1994, abandoned.

[51] Int. Cl.$^6$ ........................................ C01F 17/00
[52] U.S. Cl. .............. 423/263; 423/21.1; 423/244.01; 423/244.09; 423/247; 502/216; 502/302
[58] Field of Search .................. 423/570, 437 M, 423/247, 244.09, 244.01, 21.1, 263; 502/216, 302, 439, 514

[56] References Cited

U.S. PATENT DOCUMENTS

| | | | |
|---|---|---|---|
| 3,914,389 | 10/1975 | Haacke | 423/263 |
| 3,931,390 | 1/1976 | Palilla et al. | 423/244 |
| 3,931,393 | 1/1976 | Palilla | 423/570 |
| 3,961,016 | 6/1976 | Gerstein et al. | 423/247 |
| 3,978,200 | 8/1976 | Bajars | 423/570 |
| 4,022,870 | 5/1977 | Palilla et al. | 423/244 |
| 4,589,978 | 5/1986 | Green et al. | 208/113 |
| 5,028,310 | 7/1991 | Pratt et al. | 208/121 |
| 5,242,673 | 9/1993 | Flytzani-Stephanopoulos et al. | 423/570 |
| 5,399,327 | 3/1995 | Kim | 423/244.11 |

FOREIGN PATENT DOCUMENTS

| | | | |
|---|---|---|---|
| 59-164631 A | 9/1984 | Japan | 423/263 |
| 1384326 | 3/1988 | U.S.S.R. | 423/437 M |

OTHER PUBLICATIONS

Baglio "Lanthanum Oxysulfide as a Catalyst for the Oxidation of CO and COS by SO$_2$," Ind. Eng. Chem. Prod. Res. Dev. vol. 21 No. 1 pp. 38–41, Mar. 1982.

Hibbert et al. "Flue Gas Desulphurisation:Catalytic Removal . . . " Applied Catalysis vol. 41 pp. 289–299, no month 1988.

*Primary Examiner*—Gary P. Straub
*Assistant Examiner*—Timothy C. Vanoy
*Attorney, Agent, or Firm*—Burns, Doane, Swecker & Mathis, L.L.P.

[57] ABSTRACT

The present invention discloses a method for the catalytic reduction of sulfur dioxide, for example in flue gas, by carbon monoxide using lanthanum oxysulfide as the active catalyst. The catalyst is prepared from lanthanum oxide by hydration and sulfidization, the latter step being carried out in the gas stream itself. This method of preparation has more general applicability and can also be used as a method for the preparation of lanthanum, yttrium, gadolinium and lutetium oxysulfides generally.

7 Claims, 4 Drawing Sheets

METHOD FOR PREPARING THE OXYSULFIDES OF RARE EARTH ELEMENTS

This application is a divisional of application Ser. No. 08/674,715, filed Jul. 2, 1996, pending, which is a continuation-in-part of application Ser. No. 08/357,028, filed Dec. 16, 1994 now abandoned.

FIELD OF THE INVENTION

This invention relates to the removal of sulfur dioxide from waste gas streams by catalytic reduction by CO using a novel catalyst comprising a rare earth oxysulfide such as lanthanum oxysulfide. The main products of the reduction are carbon dioxide and elemental sulfur. The invention also extends to a method for preparing lanthanum oxysulfide and other rare earth oxysulfides.

BACKGROUND OF THE INVENTION

Sulfur dioxide discharged into the atmosphere as a by-product of fuel combustion and ore roasting processes is one of the major components of acid rain and other forms of atmospheric pollution. The need for sulfur dioxide removal is well established but the high cost of existing processes (including the disposal of by-products) has prevented the wide application of sulfur dioxide removal from coal-fired power plants, smelters etc.

There are many existing processes: wet and dry scrubbing are among the more popular methods. These scrubbing methods use a large amount of liquid/solid sorbents to absorb sulfur dioxide, turning the harmful gaseous pollutant into liquid or solid forms which then require further treatment and/or disposal. The capital and running costs of such systems are generally high, the operation is complicated and the processes involved are not especially "clean".

Today, many countries have industries that emit large quantities of sulfur dioxide in flue gas for energy needs, while at the same time mining elemental sulfur for the production of sulfuric acid, which is the second largest quantity of chemical produced in the world. It would therefore be beneficial to find a commercially viable process of obtaining elemental sulfur from sulfur dioxide in flue gas.

PRIOR ART

One known process is the Claus process. The main reaction of the Claus process is:

$$SO_2 + 2H_2S = 2H_2O + 3/2 S_2$$

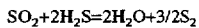

The Claus process has been used for many years in refineries or where hydrogen sulfide is readily available. Unfortunately the process is handicapped by the fact that it requires the correct stoichiometric ratio between the reactants and cannot tolerate the presence of oxygen. Furthermore it is a multistage process. When it comes to flue gas hydrogen sulfide is not normally present in substantial quantities and it is necessary to generate a supply of hydrogen sulfide.

Sulfur dioxide can also be removed by catalytic reduction methods, e.g. by carbon monoxide:

$$SO_2 + 2CO = 2CO_2 + 1/2 S_2$$

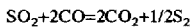

With a suitable catalyst complete reduction can be achieved with minimal generation of side products. Unlike the scrubbing methods this method does not produce any solid or liquid wastes, the products are carbon dioxide which can be discharged into the atmosphere and almost pure sulfur which may be used commercially, e.g. in the production of sulfuric acid. Catalytic reduction with CO also has the advantage that CO may be already present in the gas stream as a combustion product.

A number of catalysts have been proposed for both the Claus process and also for catalytic reduction. U.S. Pat. Nos. 3,978,004, 4,062,932 and 4,374,819 describe the use of lanthanum and other rare-earth containing catalysts in Claus-type processes. U.S. Pat. No. 4,062,932 discloses the elimination of carbonyl sulfide by lanthanum oxysulfide and the use of a lanthanum oxide containing catalyst in a Claus reaction. The catalyst contains lanthanum oxide or other rare earth oxides or a mixture of rare-earth and transition metal oxides. The pre-treatment of the catalyst involves hydrogen sulfide as the only or major component. The desulfurization process itself has three stages: two Claus steps and one oxidation step at the end to minimize hydrogen sulfide and carbonyl sulfide emission.

U.S. Pat. Nos. 3,931,390, 3,931,393, 3,978,200 and 4,022,870 describe the use of mixed metal oxide catalysts in the reduction of sulfur dioxide to elemental sulfur. The catalysts contain a rare-earth oxide such as lanthanum, yttrium, gadolinium or cerium oxide, and one other metal oxide such as cobalt, zirconium or titanium oxide.

U.S. Pat. No. 5,242,673 describes a sulfur dioxide reduction process using a cerium oxide catalyst. This process is a single-stage catalytic reduction of sulfur dioxide in the feed gas to elemental sulfur. However the catalyst has very low productivity (space velocity of 2000 hr$^{-1}$ as shown in their examples) and from the inventor's published literature it is apparent that it is not water resistant.

The use of lanthanum oxysulfide in combination with a transition metal sulfide (e.g. CoS$_2$) as a catalyst for the reduction of sulfur dioxide by carbon monoxide has been reported by Baglio (*Ind. Eng. Chem. Prod. Res. Dev* 1982, 21, pp38–41) where the process is a two-step reaction with the transition metal sulfide being an essential component. However, Baglio specifically reported that lanthanum oxysulfide alone had no catalytic effect and minimal reduction of sulfur dioxide was observed.

SUMMARY OF THE INVENTION

The present inventors have discovered that contrary to the teachings of the prior art rare earth oxysulfides and oxysulfide/oxydisulfide mixtures alone may be a highly efficient catalyst. According to the present invention there is provided a method for the catalytic reduction of sulfur dioxide to elemental sulfur employing the reduction reaction, $$SO_2 + 2CO = 2CO_2 + 1/2 S_2$$

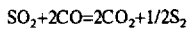

wherein said reaction is carried out in the presence of a catalyst comprising a rare earth oxysulfide or oxysulfide/oxydisulfide as the only active component at a temperature of between 350° C. and 750° C.

It has been discovered by the present applicants that a particularly preferred rare earth element for this catalytic reaction is lanthanum and lanthanum oxysulfide is a highly effective catalyst for the reduction of sulfur dioxide by carbon monoxide. There is no report in the literature that suggests that lanthanum oxysulfide is an effective catalyst for this reaction. The catalyst may be either supported or unsupported, and may of course comprise either substantially pure lanthanum oxysulfide or a mixture including lanthanum oxysulfide.

In this reaction the lanthanum oxysulfide catalyst may be prepared by activation of lanthanum oxide in a reaction stream containing sulfur dioxide and carbon monoxide at not less than 400° C. The reaction temperature is preferably between 400° C. and 700° C. and more preferably from 500° C. to 600° C. With a space velocity for the gas stream of between 2000 to 30,000 $hr^{-1}$ a conversion from sulfur dioxide to elemental sulfur of 80% to 100% may be achieved. The lanthanum oxide is preferably hydrated prior to being placed in the reaction stream. Any convenient hydration method may be employed but it is particularly simple to expose the lanthanum oxide to ambient atmosphere for a required time (depending on atmospheric conditions), or to expose the oxide to an atmosphere saturated with water vapour. Other possibilities for the hydration step include heating and refluxing with an excess of water.

The method of preparing the lanthanum oxysulfide from lanthanum oxide as a catalyst for the reduction to elemental sulfur of sulfur dioxide by carbon monoxide has the advantage that the sulfidization step may be performed in the gas stream itself.

The method of the present invention has the advantage that the conversion from sulfur dioxide to elemental sulfur involves only one stage making the process simple to design and operate. In addition there is low COS formation (a known problem with prior techniques), and a high conversion rate. A further advantage is that the catalyst can be prepared from low cost simple starting materials.

The method of activating the catalyst by preparing the oxysulfide from the oxide has more general applicability and the same method in essence may be used to prepare the oxysulfides of other rare earth elements (RE) such as yttrium, gadolinium, and lutetium in addition to lanthanum in a particularly simple and cheap manner. Such oxysulfides have other industrial applications, but currently are very expensive.

Accordingly the present invention also extends to a method for preparing the oxysulfide of the rare earth elements e.g. lanthanum, yttrium, gadolinium or lutetium from the rare earth oxide, comprising the steps of:

(1) hydrating the rare earth oxide to form the hydroxide, and (2) sulfidizing the resulting hydroxide by reacting with carbon monoxide and sulfur dioxide.

These steps may be followed by a purification step if necessary. It is possible to omit the hydration step, but in this case the reaction time is much longer. Again the hydration step may comprise exposure to ambient atmosphere for a sufficient period of time, exposure to atmosphere saturated with water vapour, refluxing with water, or any conventional hydration technique.

The sulfidization can be carried out at a temperature of from 400° C. to 1200° C., and preferably from 550° C. to 750° C. Preferably the ratio of carbon monoxide to sulfur dioxide is 2:1 on a molar basis.

Sulfidization of decomposition products of $RE(OH)_3$, formed by exposing $RE_2O_3$ to atmosphere, which include $RE(OH)_3$, REOOH, $RE_2O_3$, and not excluding $RE_2(OH)_4CO_3 \cdot nH_2O$, $RE_2O_2CO_3$ and mixtures of these compounds, is also possible using this process.

In the sulfidization step elemental sulfur, formed from the reduction of $SO_2$ by CO, and other substances may be adsorbed on the surface of the oxysulfide. To raise the purity of the product therefore a purification step may be employed. Preferably this step comprises a high temperature inert gas purge, e.g. using nitrogen at between 600° to 750° C. for at least two hours. The purification can also be done at a lower temperature in vacuum.

It has also been found that the oxysulfides and oxysulfide/oxydisulfide mixtures of other rare earth elements, such as yttrium, gadolinium, lutetium, neodymium, dysprosium and europium, prepared in this way may also serve as catalysts for the reduction by CO of $SO_2$.

BRIEF DESCRIPTION OF THE DRAWINGS

Several examples illustrative of preferred embodiments of the present invention will now be described with reference to the accompanying drawings, in which.

DETAILED DESCRIPTION OF EXAMPLES
Desulfurization Examples
Example 1

An externally heated fixed-bed reactor fabricated from a 2 cm diameter by 50 cm long quartz tube was used in the experiments described in these examples. The temperature of the catalyst bed was controlled to within 1° C. and the feed gas was fed from the top of the reactor.

A gas mixture containing 0.5% mol $SO_2$, 1.0% CO and UHP $N_2$ entered the reactor at a constant flow rate of 180 ml/min measured at atmospheric pressure.

$CO_2$ and unconverted $SO_2$ concentrations in the reactor exhaust were measured using non-dispersive infra-red analyzers. A gas chromatograph with two columns and TCD detectors was used in parallel to determine the unconverted CO, any side-products formed and unconverted $SO_2$ (as a double check). Elemental sulfur was removed from the product gas stream by passing the gas through an ice-bath trap and a filter with an average pore size of 2 μm.

Figure 1:
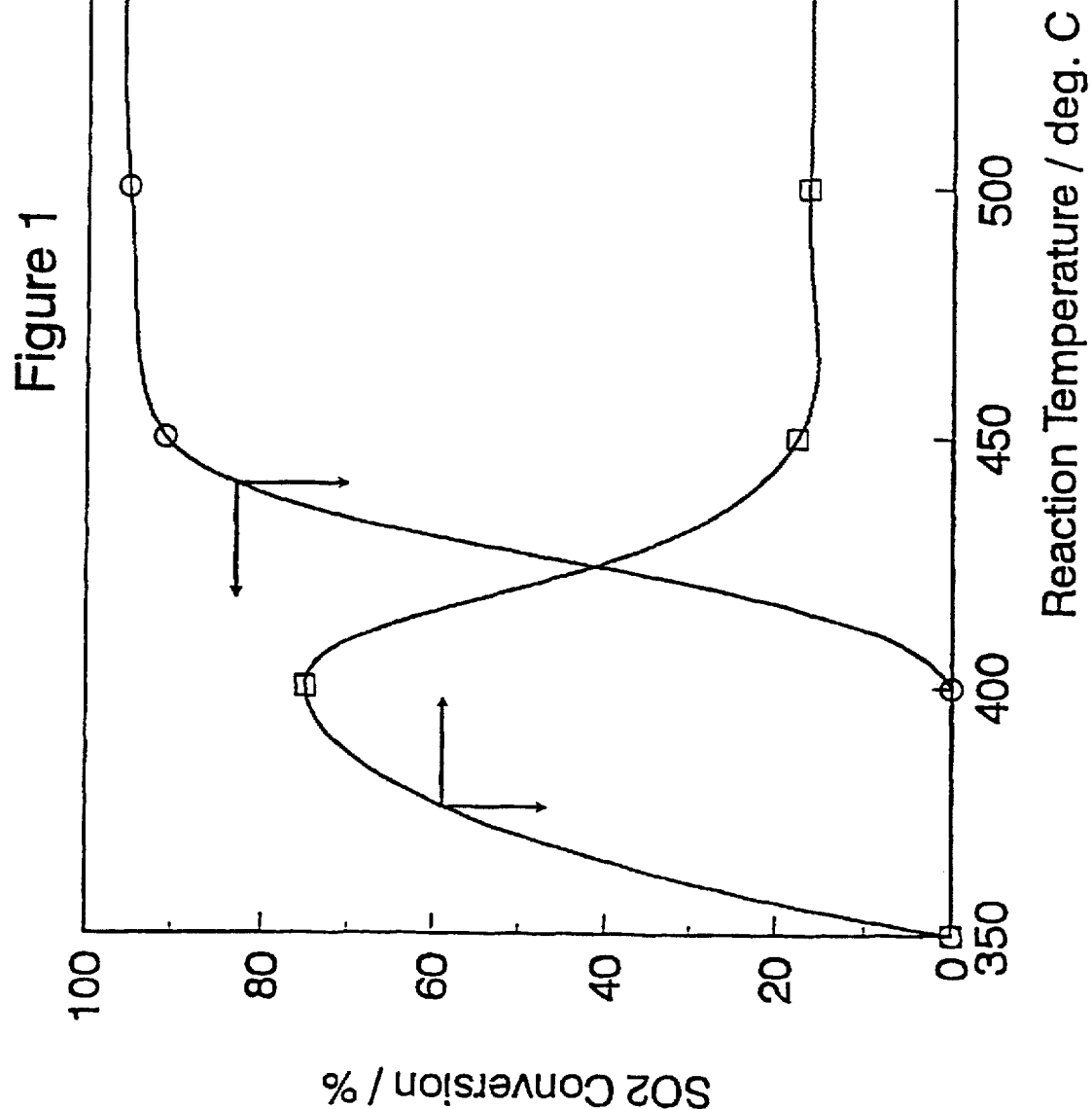
FIG. 1 shows the $SO_2$ conversion and COS formation as a function of the reaction temperature.

Half a gram of $La_2O_2S$ catalyst prepared from $La_2O_3$ by hydration by exposure to atmosphere and sulfidization at 600° C. method (as will be described in more detail below in Example 15) was used. This corresponded to a gas space velocity of 21,600 ml/hr.g. The activity and selectivity of the catalyst measured at different temperatures are shown in FIG. 1. The only detectable side-product was COS. The $SO_2$ conversion increased with the reaction temperature while the formation of COS went through a maximum at around 400° C. At 600° C., the $SO_2$ conversion was 96% and the selectivity was 98.4%.

The catalyst was characterized after the experiment by XRD (X-ray diffraction) and no change in structure was detected.

Contrary to the literature where it was reported that $La_2O_2S$ was not an effective catalyst for the reduction of $SO_2$ using CO, our experiment showed that active $La_2O_2S$ can be made from $La_2O_3$ and is a very effective catalyst for the reaction.

Example 2

One hundred grams of 99.99% pure $La_2O_3$ powder was hydrated by exposure to air for at least 6 months to form a sample of $La(OH)_3$ with a specific surface area of 6.46 $m^2/g$, as is described below in Example 16.

A series of simultaneous sulfiding and reduction experiments were carried out with the conditions described in Example 1. The ratio of $CO/SO_2$ in the feed stream was varied and the gas space velocity was changed by changing catalyst weight and feed flow rate. The results are presented in Table 1. The results show that by increasing the CO/SO$_2$ ratio, almost complete reduction of SO$_2$ can be obtained at about 450° C.

This example shows that the catalyst of the present invention can be used in an oxygen containing environment.

Example 7

TABLE 1

| Weight of catalyst | Space velocity | CO/SO$_2$ | SO$_2$ Conversion (%) | | | | Selectivity (%) | | | |
|---|---|---|---|---|---|---|---|---|---|---|
| (g) | (ml/hr · g) | ratio | 450 C. | 500 C. | 550 C. | 600 C. | 450 C. | 500 C. | 550 C. | 600 C. |
| 0.5 | 21,600 | 2.00 | 90.1 | 95.1 | 95.8 | 95.1 | 98.2 | 98.4 | 98.3 | 98.6 |
| 1.0 | 6,000 | 2.26 | 100 | 100 | 100 | 100 | | | | |

Example 3

A sample of catalyst with a specific surface area of 3.37 m$^2$/g. was prepared by hydration by exposure to atmosphere and sulfidization as described in Example 17 below. The catalyst was used for the reduction of SO$_2$ with CO; the SO$_2$ conversion and selectivity at 600° C. with a space velocity of 6.000 ml/hr.g were 98.1% and 95.6%, respectively, and 94.4% and 97.5% at a space velocity of 21.600 ml/hr.g.

Example 4

A sample of 44.5 grams of La$_2$O$_3$ was hydrated by the exposure to atmosphere method as described in Example 2, was calcined at 900° C. for 12 hours and cooled to room temperature. The calcination product was 41.0 grams of powder and XRD analysis showed that it was A-La$_2$O$_3$. The specific surface area of the A-La$_2$O$_3$ was 6.35 m$^2$/g (see Example 18 below).

The reduction procedure of Example 1 was repeated using only 0.5 gram of the A-La$_2$O$_3$ as catalyst. The activity and selectivity measured after 2 hours reaction were 70% and 99%, respectively. XRD analysis revealed that a significant amount of La$_2$O$_3$ was found even after a reaction time of 7 hours.

Example 5

The procedure of Example 4 was repeated with the hydration step carried out in a quartz tube and followed by the in situ calcination of the catalyst precursor.

After two hours of experiment at 600° C., the SO$_2$ conversion and selectivity were 64% and 98% respectively. By extending the reaction time to 28 hours, the conversion increased to 89.5% and the selectivity decreased to 96.2%. XRD analysis showed that almost all of the sample was converted to La$_2$O$_2$S at the end of the experiment.

Examples 4 and 5 clearly indicate that La$_2$O$_3$ can be activated by sulfiding in the reduction gas mixture stream to form the oxysulfide catalyst, however, the time required is much longer than when a hydration step was used. This may be one of the reasons why the other investigators harvested the opinion that La$_2$O$_3$ is inactive as a catalyst for the SO$_2$ reduction.

Example 6

The procedure of Example 3 was repeated except 0.5 gram of the catalyst, La$_2$O$_2$S, was used and the concentration of oxygen in the reaction gas mixture was varied to study the effect of oxygen on the catalyst.

Figure 2:
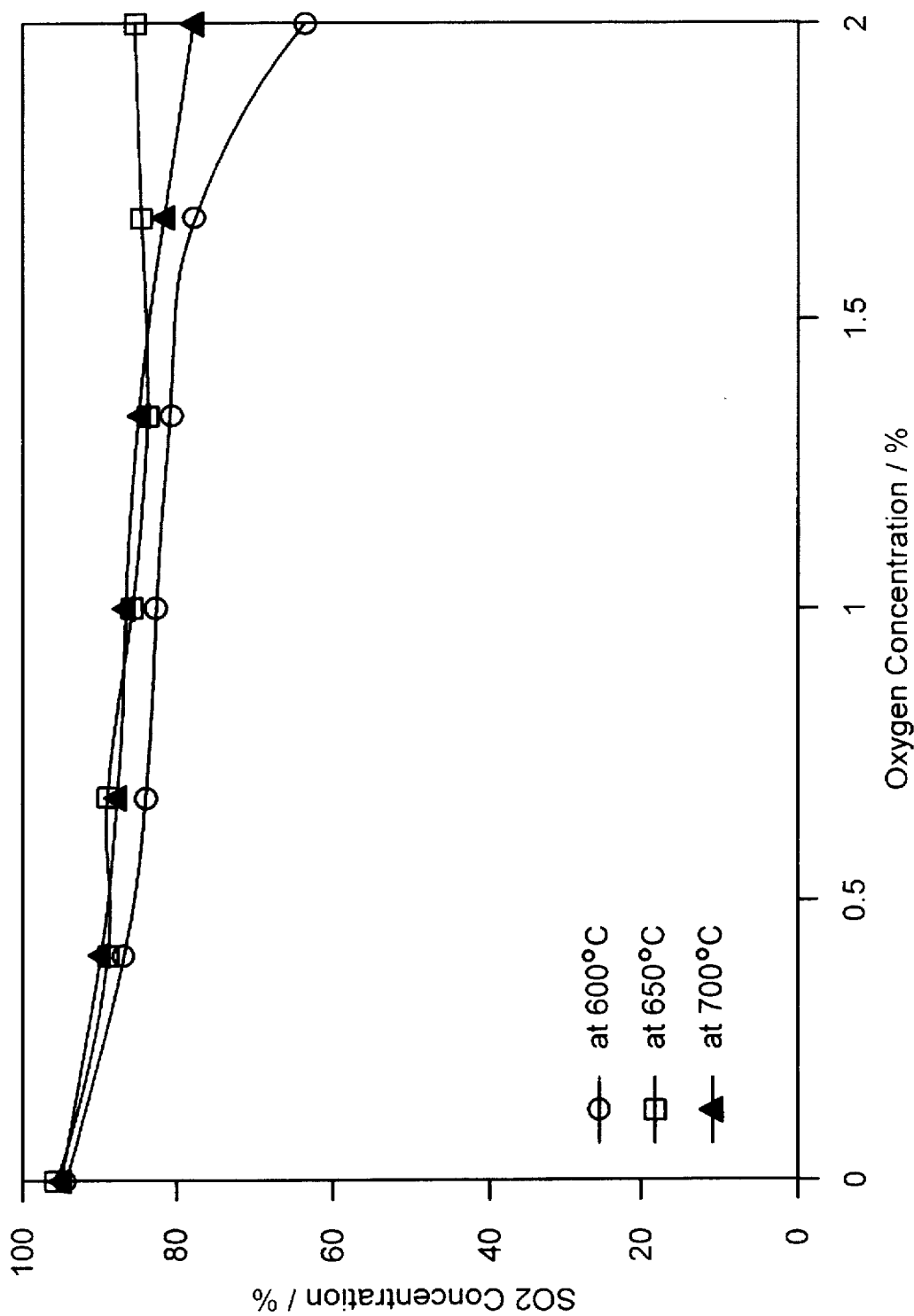
FIG. 2 shows the $SO_2$ conversion as a function of oxygen concentration.

The effect of oxygen on the SO$_2$ conversion is shown in FIG. 2. It can be seen that the conversion decreased slowly when more oxygen was present and the influence of oxygen could be inhibited by increasing the reaction temperature. At an oxygen concentration of 2.0% and 650° C., the conversion was 85.3% and the selectivity was 91.7%. It was also found that after about 10 hours of exposure to the oxygen containing gas stream at temperatures above 600° C., the catalyst did not change structure and remained as La$_2$O$_2$S.

Figure 3:
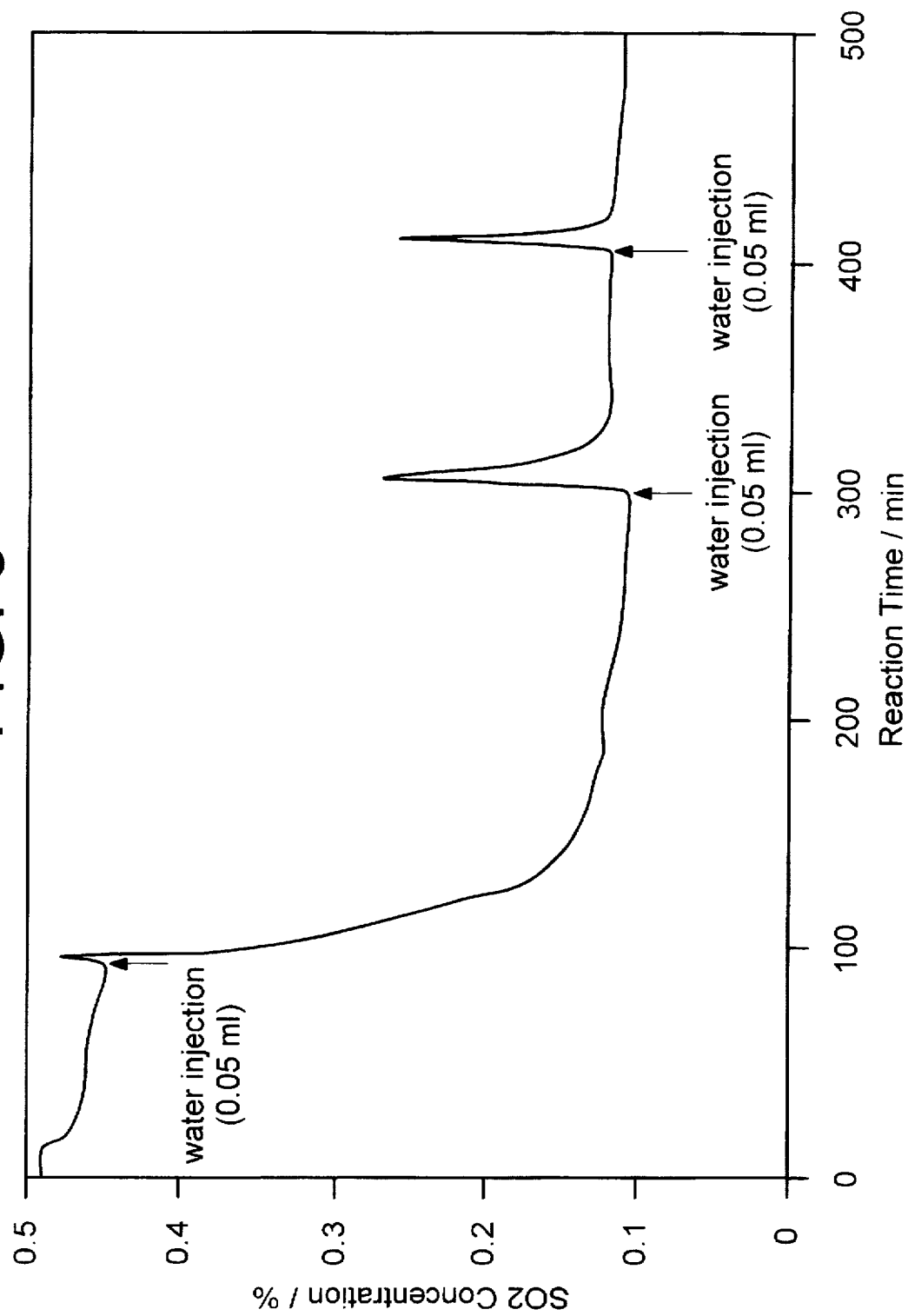
FIG. 3 shows the effect of the presence of water.

The procedure in Example 1 was repeated to test the resistance of this invention to moisture by injecting water during the reaction. Half a gram of A-La$_2$O$_3$ was used and the results are shown in FIG. 3.

It can be seen that the A-La$_2$O$_3$ was quickly activated after the injection of the first 0.05 ml of water into the reactor. The subsequent introduction of water after steady-state was established caused a decrease in SO$_2$ conversion, however, each time it did not take long to regain the steady-state value. This example indicates that the hydration and sulfidization steps can be carried out simultaneously and the catalyst of the present invention is water resistant.

Example 8 (For comparison)

A mixture containing 3.26 g of 99.99% pure La$_2$O$_3$ and 6.00 g of 97% pure Co(NO$_3$)$_2$.6H$_2$O was ground in a ball mill and transferred to a ceramic crucible. The sample was calcined in a furnace at 750° C. for 8 hours. After cooling to room temperature, the sample was ground to pass a 200 mesh sieve and calcined again at 800° C. for 9 hours. After cooling, the sample was ground once more and re-calcined at 900° C. for 10 hours. XRD analysis showed the sample has only a single perovskite, LaCoO$_3$, phase.

A sample of the powdery material weighing 0.5 g was placed in the quartz reactor and was sulfidized in the same manner as described in Example 1.

After a reaction time of 8 hours at 600° C., the SO$_2$ conversion and selectivity were 95.7% and 97.9%, respectively. XRD characterization found that the perovskite was decomposed by the reaction and the lanthanum part of the crystal was sulfidized to form La$_2$O$_2$S while the cobalt was sulfidized to form CoS$_2$ and CoS$_{1.097}$.

It is clear from this investigation that the oxysulfide is the active ingredient in the mixture; the perovskite, LaCoO$_3$, can be a catalyst precursor but it is not any more superior to the simple La(OH)$_3$ preferred by the preparation method disclosed.

Example 9

The procedure of Example 1 was repeated with 0.5 grams of yttrium oxide (Y$_2$O$_3$) at 600° C. The conversion of sulfur dioxide was 88% at steady state. XRD showed that the sample was converted to a mixture of yttrium oxide (Y$_2$O$_3$) and yttrium oxysulfide (Y$_2$O$_2$S).

Example 11

The procedure of Example 1 was repeated with 0.5 grams of neodymium oxide as received, which was shown to contain neodymium oxide (Nd$_2$O$_3$) and neodymium hydroxide (Nd(OH)$_3$) at 600° C. The conversion of sulfur dioxide was 93% at steady state. XRD showed that the sample was converted to neodymium oxysulfide (Nd$_2$O$_2$S).

Example 12

The procedure of Example 1 was repeated with 0.5 grams of europium oxide (Eu$_2$O$_3$) at 600° C. The conversion of sulfur dioxide was 85% at steady state. XRD showed that the sample was converted to a mixture of europium oxide ($Eu_2O_3$) and europium oxysulfide ($Eu_2O_2S$).

Example 13

The procedure of Example 1 was repeated with 0.5 grams of gadolinium oxide ($Gd_2O_3$) at 600° C. The conversion of sulfur dioxide was 93% at steady state. XRD showed that the sample was converted to gadolimium oxide ($Gd_2O_3$) and gadolinium oxysulfide ($Gd_2O_2S$).

Example 14

The procedure of Example 1 was repeated with 0.5 grams of dysprosium oxide ($Dy_2O_3$) at 600° C. The conversion of sulfur dioxide was 79% at steady state. XRD showed that the sample was converted to a mixture of dysprosium oxide ($Dy_2O_3$) and dysprosium oxysulfide ($Dy_2O_2S$).

Examples of the preparation of oxysulfide

Example 15

Five grams of 99.99% pure $La_2O_3$ powder was calcined in a furnace at 900° C. for 12 hours and cooled in air to room temperature. XRD (X-ray diffraction) analysis showed that only A-$La_2O_3$ phase existed in the sample. The sample was hydrated by placing in a closed container under atmosphere saturated with water at room temperature for one week. XRD analysis revealed that this treatment led to a complete conversion of $La_2O_3$ to $La(OH)_3$.

Half a gram of the pretreated sample was used as starting material and was sulfided in a quartz reactor under a gas stream containing 0.5% v $SO_2$, 1.0% v CO and 98.5% v $N_2$ at 600° C. for 2 hours. The sulfided material contained neither $La_2O_3$ nor $La(OH)_3$ when analyzed by X-ray diffraction; the only distinct phase was $La_2O_2S$.

Example 16

One hundred grams of 99.99% pure $La_2O_3$ powder was exposed to air for at least 6 months. The moisture in the atmosphere was sufficient to hydrate the material. The thus obtained sample had a specific surface area of 6.46 $m^2$/g and was completely converted to $La(OH)_3$ when examined using XRD. The sulfiding procedure as outlined in Example 15 was used to completely convert the product to $La_2O_2S$.

Example 17

Figure 4:
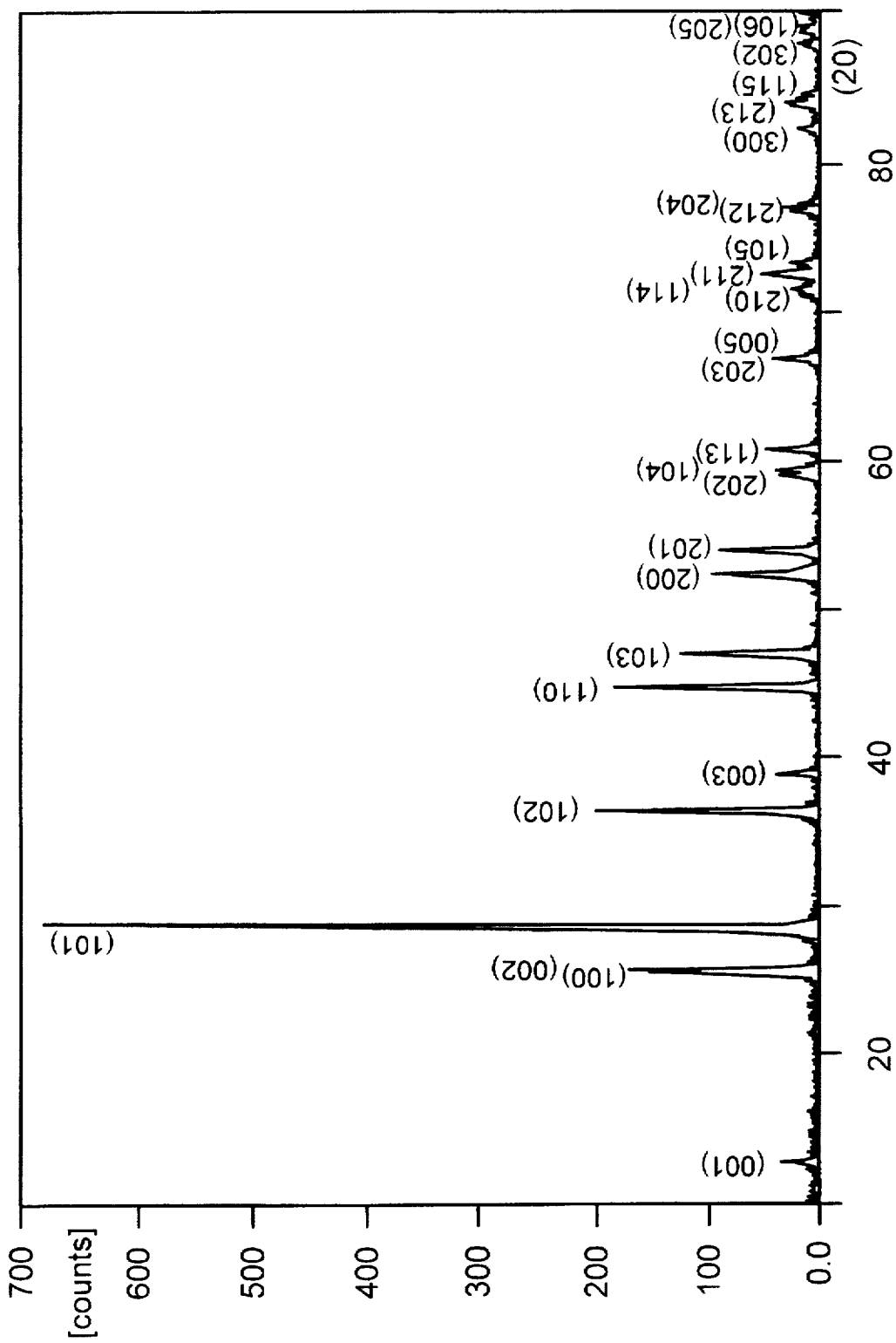
FIG. 4 shows the results of X-ray diffraction analysis in Example 11.

$La_2O_2S$ was prepared as follows: 5.0 grams of the air exposed $La_2O_3$ as described in Example 10 was placed in a quartz reactor and a gas mixture containing $SO_2$ and CO was introduced. The sample was sulfidized according to a temperature programmed sequence: 600° C. for 2 hours, 650° C. for 4 hours, 700° C. for 6 hours and 750° C. for 8 hours. XRD analysis showed that well crystallized single phase $La_2O_2S$ was formed (see FIG. 4). The $La_2O_2S$ prepared had specific surface area of 3.37 $m^2$/g.

Example 18

A 44.5 gram sample of $La_2O_3$ was hydrated by the method described in Example 16. It was calcined at 900° C. for 12 hours and cooled to room temperature, resulting in 41.0 grams of product in powder form. XRD analysis showed that the heat treated product was A-$La_2O_3$ with a specific surface area of 6.35 $m^2$/g.

The sulfiding procedure in Example 15 was repeated except 0.5 gram of the A-$La_2O_3$ was used. XRD analysis revealed that a significant amount of $La_2O_3$ remained even after a reaction time of more than 7 hours.

Example 19

The procedure in Example 18 was repeated and water vapor was injected into the reactor during the sulfidization reaction. XRD analysis showed that the A-$La_2O_3$ was converted to oxysulfide. This demonstrates that hydration and sulfidization can be carried out in one-step.

Example 20

A 5.0 gram sample of $La(OH)_3$ formed by exposure in atmospheric moisture was calcined at 400° C. for 12 hours. XRD analysis identified that LaOOH was formed as a decomposition product.

Half a gram of the LaOOH powder was placed in a quartz reactor and sulfidized by the method as described in Example 15. It was found that in addition to $La_2O_2S$ a significant amount of $La_2O_2S_2$ was formed.

Example 21

Half a gram of the $La(OH)_3$ formed by exposure in atmospheric moisture was placed in a quartz tube. The sample was decomposed at 400° C. under vacuum ($10^{-2}\tau$) for 2 hours. The sulfidization procedure of Example 15 was used. XRD analysis showed that the product was a mixture of $La_2O_2S$ and $La_2O_2S_2$.

We claim:

1. A method for preparing the oxysulfide of the rare earth elements selected from the group consisting of lanthanum, yttrium, gadolinium, neodymium, europium and dysprosium from the corresponding rare earth oxide, comprising the steps of (1) hydrating the rare earth oxide to form the hydroxide, and then (2) sulfidizing the resulting hydroxide by reacting with carbon monoxide and sulfur dioxide.

2. A method as claimed in claim 1 wherein the sulfidization step is carried out at a temperature of from 400° C. to 1200° C.

3. A method as claimed in claim 2 wherein the sulfidization step is carried out at a temperature of from 500° C. to 750° C.

4. A method as claimed in claim 1 wherein the carbon monoxide to sulfur dioxide mole ratio is about 2:1.

5. A method as claimed in claim 1 wherein said process further comprises a purification step which comprises treating the oxysulfide of the rare earth element with nitrogen at a temperature of between 600° C. to 750° C. for at least two hours.

6. A method as claimed in claim 1 wherein said hydration step comprises exposure to ambient atmosphere.

7. A method as claimed in claim 6 wherein said hydration step comprises exposure to atmosphere with water vapour.

* * * * *